(12) United States Patent
Cimaz

(10) Patent No.: US 8,917,864 B2
(45) Date of Patent: Dec. 23, 2014

(54) FULL-DUPLEX AUDIO COMMUNICATION TERMINAL

(75) Inventor: Lionel Cimaz, Pleumeleuc (FR)

(73) Assignees: St-Ericsson SA, Plan-les-Ouates (CH); St-Ericsson (France) SAS, Grenoble (FR)

(*) Notice: Subject to any disclaimer, the term of this patent is extended or adjusted under 35 U.S.C. 154(b) by 83 days.

(21) Appl. No.: 13/320,477

(22) PCT Filed: May 11, 2010

(86) PCT No.: PCT/EP2010/056508
§ 371 (c)(1),
(2), (4) Date: Jan. 13, 2012

(87) PCT Pub. No.: WO2010/130761
PCT Pub. Date: Nov. 18, 2010

(65) Prior Publication Data
US 2012/0114115 A1 May 10, 2012

(30) Foreign Application Priority Data

May 15, 2009 (FR) ..................................... 09 53244

(51) Int. Cl.
*H04M 9/08* (2006.01)

(52) U.S. Cl.
CPC ..................................... *H04M 9/082* (2013.01)
USPC .................................. 379/406.16; 379/406.07

(58) Field of Classification Search
CPC ........ H04M 9/082; H04M 3/002; H04M 9/08
USPC .................. 379/392, 392.01, 406.01–406.16, 379/22.08, 167.14, 345, 347; 455/63.1, 455/67.13, 114.2, 222, 277.2, 278.1, 501, 455/570
See application file for complete search history.

(56) References Cited

U.S. PATENT DOCUMENTS

| 5,295,225 | A  | * | 3/1994 | Kane et al. ..................... 704/226 |
| 5,297,198 | A  | * | 3/1994 | Butani et al. ............. 379/388.04 |
| 5,771,440 | A  |   | 6/1998 | Sukhu et al. |
| 6,212,273 | B1 | * | 4/2001 | Hemkumar et al. ..... 379/406.08 |
| 6,434,110 | B1 | * | 8/2002 | Hemkumar ..................... 370/201 |
| 6,799,062 | B1 | * | 9/2004 | Piket et al. ................. 455/569.1 |
| 8,204,210 | B2 | * | 6/2012 | van de Laar ............... 379/406.1 |
| 2008/0008332 | A1 | * | 1/2008 | Sudou .......................... 381/94.1 |
| 2008/0159560 | A1 | * | 7/2008 | Song et al. ................... 381/94.1 |

FOREIGN PATENT DOCUMENTS

| FR | 2816791 A1 | 5/2002 |
| WO | 2007003579 A1 | 1/2007 |

* cited by examiner

*Primary Examiner* — Akelaw Teshale
(74) *Attorney, Agent, or Firm* — Coats & Bennett, PLLC

(57) ABSTRACT

A full duplex audio communication terminal (100) comprises a noise attenuation module (4) arranged on a transmission path of the terminal. The noise attenuation module comprises two activation thresholds, which are respectively intended to be adjusted above a noise level and above an echo level of transmission signals (TC) produced by the terminal. The first or the second activation threshold is selected as a function of the detection of signals (R) received by said terminal. An improvement to the suppression in the transmission signals of echoes from received signals is thus obtained which is compatible with the principle of full duplex communication. Preferably, the noise attenuation module processes transmission signals which are produced by an echo compensator (2). Residual echo still present in the transmission signals already processed by the echo compensator is thus further reduced.

14 Claims, 3 Drawing Sheets

FULL-DUPLEX AUDIO COMMUNICATION TERMINAL

This invention relates to a communication terminal capable of sending and receiving audio signals in a full duplex communication mode. It also relates to a process for transmitting audio signals using full-duplex communication mode.

In full duplex communication mode, two terminals can simultaneously exchange communication signals, for example between a local terminal and a remote terminal. In other words, communication signals can be transmitted from the local terminal to the remote terminal at the same time as other communication signals are transmitted in the other direction, from the remote terminal to the local terminal.

When the communication signals are audio signals, the signals received by each terminal are converted by this terminal into an audio message by means of a speaker. When a microphone of the terminal receives spoken words or sounds, it converts them into communication signals which it transmits to the other terminal.

However, at each terminal, an audio message produced after receipt of audio communication signals may be partially captured by the microphone of that terminal. It is then retransmitted to the other terminal where the initial communication signals originated from, and from which the audio message was produced. This is the echo phenomenon which occurs in full duplex audio communications.

Echoes may also result from crosstalk occurring in one or the other of the terminals during communication.

No matter what their origin, echoes are unpleasant and irritating for the terminal users. Several methods have therefore been developed for reducing them to a level which is not irritating.

A first one of these methods consists in placing an echo compensator at the output of the transmitter of a terminal's audio communication signal. The principle of operation of such echo compensator consists in looking for a contribution from the signals received by the terminal, within the signals to be transmitted by the terminal. The received signals from which this contribution originates are then subtracted from the signals to be transmitted, by adapting an amplitude coefficient, so that useful signals are sent from which this contribution has been removed to the fullest extent possible. Such echo compensator, called a linear compensator, is particularly efficient when the received signal contribution within the signals to be transmitted, or echo, is substantially proportional to the received signals. However, it is not sufficiently effective when non-linear behaviors such as saturation occur in the echo formation.

There also exist non-linear echo compensators, which are capable of better compensating for echoes in the presence of non-linear echo mechanisms. These non-linear echo compensators use echo formation models, capable of varying in a suitable manner as a function of the actual echoes detected. Such non-linear echo compensators are highly complex, and when the actual echo no longer corresponds to the echo formation model used, the efficiency of the echo compensator is again insufficient.

A second method consists of inserting an echo suppressor in the transmission path of a full duplex communication terminal. Such echo suppressor attenuates the signals transmitted when signals are simultaneously received. The echo contained in the transmitted signals is thus attenuated. Such suppressor is thus efficient when the signals which are transmitted at one moment do not carry deliberately produced useful content. But when such useful content is present at the same time as signals received by the terminal, the useful content is also attenuated, which defeats the purpose of full-duplex communication mode.

One object of the invention is therefore to reduce the echo which may appear in a full-duplex communication, without adversely affecting the operation of such communication.

Another object of the invention is to reduce the echo of such communication when the echo is the most irritating, meaning when it is perceptible to at least one of the communication parties.

To achieve these objects, the invention proposes a communication terminal which is adapted to operate in a full duplex audio communication mode, and which comprises:
  a detector of signals received by the terminal, which is adapted to produce a reception detection signal indicating the presence or absence of received signals; and
  a noise attenuation module, which is arranged to attenuate transmission signals produced by the terminal when the level of these transmission signals is less than an activation threshold.

According to the invention, the noise attenuation module is additionally adapted to select a value for the activation threshold in a manner which varies according to the reception detection signal: a first or a second value is selected for the activation threshold when received signals are respectively absent or present, with the first value being less than the second value. In addition, the communication terminal is adapted to determine the first and the second values selected for the activation threshold so that these first and second values are also respectively greater than a noise level for the transmission signals and greater than the level of the contribution of received signals present in the transmission signals.

Thus, when the received signal detector indicates that no signal has been received, the noise attenuation module operates with the lowest value of the activation threshold, which is called the first value. This first value may be set to be just above the noise level of the transmission signal, so as to attenuate this transmission noise in the absence of useful content in the transmission signals, but without attenuating the useful content of the transmission signals once such useful content is present.

When the received signal detector indicates that signals are actually received by the terminal, the noise attenuation module operates with the highest value of the activation threshold, which is called the second value. This second value may be set to be just above the level of the echo caused by the received signals, in the transmission signal produced by the terminal. The second value of the activation threshold, however, remains less than the level of the useful content in the signals sent. The echo is therefore processed as noise in comparison to the useful content of the signals transmitted. While signals with useful content are being transmitted, the echo is not attenuated, but it is then barely perceptible or imperceptible and is not irritating to the user of the other terminal, as the useful content of the transmitted signals is then of a level which exceeds that of the echo.

In this manner, a terminal according to the invention is capable of reducing the echo which is perceptible during a full-duplex communication, without reducing the efficiency of the transmission of audio signals in both directions at the same time. In addition, it can transmit signals which correspond to a low sound amplitude, such as whispering signals, when no signal is received because no echo can then intervene.

One advantage of the invention is that it uses only simple and inexpensive components.

In various embodiments of the invention, at least one of the following improvements concerning the noise attenuation module may be used, alone or in combination:

it may allow less and less attenuation, during an attenuation reduction period of variable duration, of the transmission signals when the level of these transmission signals increases to above the selected value of the activation threshold. The period of the attenuation reduction is then advantageously longer when the reception detection signal indicates that received signals are present, in comparison to the case where the reception detection signal indicates that received signals are absent;

it may allow more and more attenuation, during an attenuation increase period of variable duration, of the transmission signals when the level of these transmission signals decreases to below the selected value of the activation threshold. The duration of the attenuation increase is then advantageously shorter when the reception detection signal indicates that received signals are present, in comparison to the case where the reception detection signal indicates that received signals are absent;

it may also allow selecting the value of the activation threshold in a variable manner based on whether the level of the transmission signals is increasing or decreasing, in at least one of the two cases where the reception detection signal indicates the presence or the absence of received signals. In other words, in the presence and/or absence of received signals, the noise attenuation module presents a functional hysteresis as a function of the variations in the level of the transmission signals; and it may allow attenuating the transmission signals if the level of these transmission signals decreases to below the selected value of the activation threshold, after a set period and if the level of the transmission signals has remained less than the selected value of the activation threshold during this period.

The invention also proposes a process for transmitting audio signals using a full duplex communication mode, comprising the following steps:

/1/ determining a noise level for transmission signals produced by a communication terminal, and a level of a contribution of signals received by this terminal which is present in the transmission signals; and /2/ attenuating the transmission signals when a level of these transmission signals is less than an activation threshold.

According to the invention, the activation threshold has a value which varies depending on whether or not signals received by the terminal are detected. Thus, a first value for the activation threshold is selected when received signals are not detected, which is less than a second value for the activation threshold which is selected when received signals are detected. In addition, the first and the second value selected for the activation threshold are respectively greater than the noise level of the transmission signals and greater than the level of the contribution of the received signals present in the transmission signals.

An optional improvement to the invention is adapted to the case where the received signal contribution which is present in the transmission signals is of a level comparable to or greater than that of the useful content of the transmission signals. In this improvement, the communication terminal may additionally comprise an echo compensator which is arranged to receive as input initial transmission signals produced by the terminal, and to produce as output echo-compensated transmission signals, these latter signals corresponding to the initial transmission signals reduced by a portion of the contribution from signals received by the terminal which is present in the initial transmission signals. The noise attenuation module is then arranged to attenuate the echo-compensated transmission signals when the level of these echo-compensated transmission signals is less than the selected value for the activation threshold. Simultaneously, the first and second values selected for the activation threshold are respectively greater than a noise level for the echo-compensated transmission signals and greater than the level of the residual contribution from received signals which is present in the echo-compensated transmission signals.

The echo compensator ensures that, in all cases, the residual contribution from received signals which is present in the transmission signals processed by the noise attenuation module is of a lower level than that of the useful content of said transmission signals. In other words, the residual echo which is present in the echo-compensated transmission signals is of a lower level than that of the useful content of said echo-compensated transmission signals. It is then possible to discriminate the residual echo in the echo-compensated transmission signals from the useful content by an appropriate choice of the second value of the activation threshold, even when there is significant echo present in the initial transmission signals.

In this case, the transmission process of the invention additionally comprises the following prior step:

/A/ in the transmission signals produced by the communication terminal, compensating for a portion of the contribution of the signals received by the terminal which is present in said transmission signals, so as to produce echo-compensated transmission signals.

Steps /1/ and /2/ of the invention are then performed using echo-compensated transmission signals, in the following manner:

/1/ determining the noise level of the echo-compensated transmission signals, and the level of the residual contribution from received signals which is present in the echo-compensated transmission signals; and /2/ attenuating the echo-compensated transmission signals when the level of said echo-compensated transmission signals is less than the value selected for the activation threshold.

The selection of the activation threshold values is also adapted in the following manner: the first value is greater than the noise level of the echo-compensated transmission signals, and the second value is greater than the level of the residual contribution from received signals which is present in the echo-compensated transmission signals.

Other features and advantages of the invention will become clear in the following non-limiting description of an example, with references to the attached drawings, in which.

In these figures, same reference numbers or notations have the same significance when reused in different figures.

Figure 1:
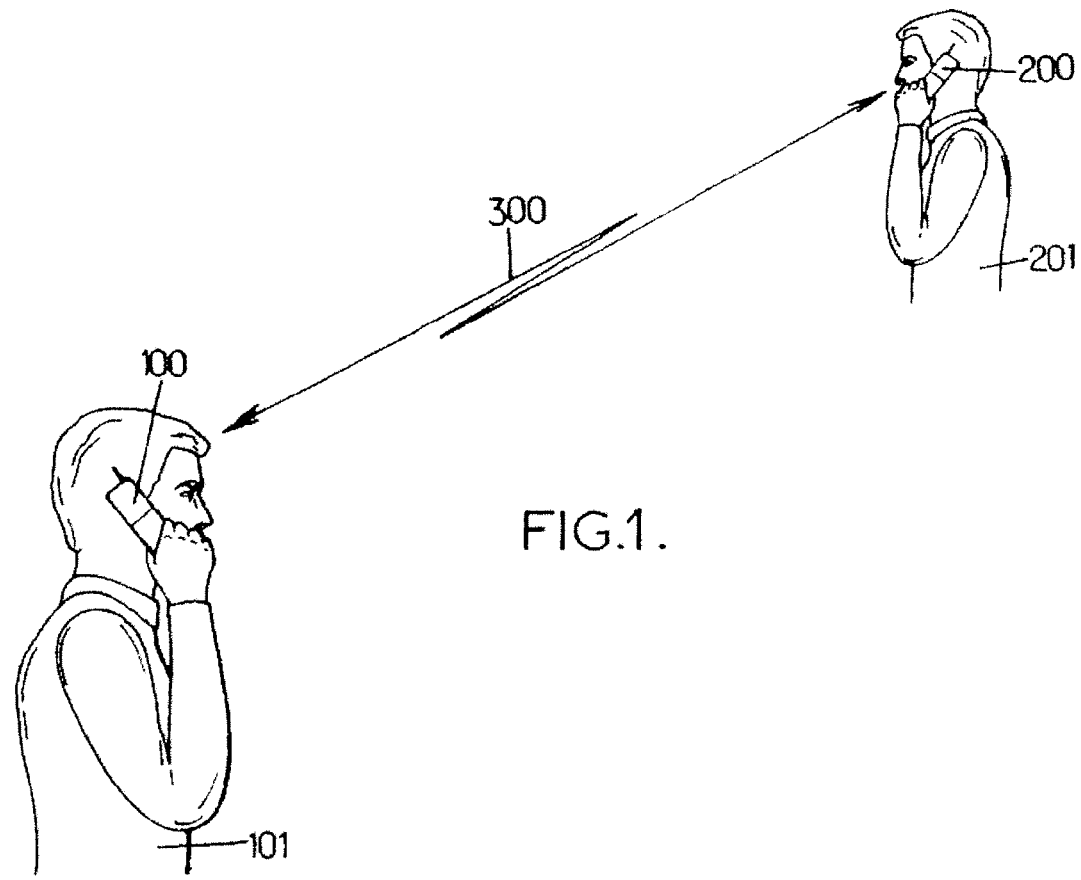
FIG. 1 shows two communication terminals to which the invention can be applied.

The invention may be used inside two mobile telephone terminals 100 and 200, as represented in FIG. 1. The users 101 and 201 of terminals 100 and 200 respectively, may be at a distance from each other, such that the terminals 100 and 200 can be designated as local and remote terminals with respect to the user 101. The arrow 300 symbolizes the full-duplex radio communication link for an audio communication session which is in progress.

Figure 2:
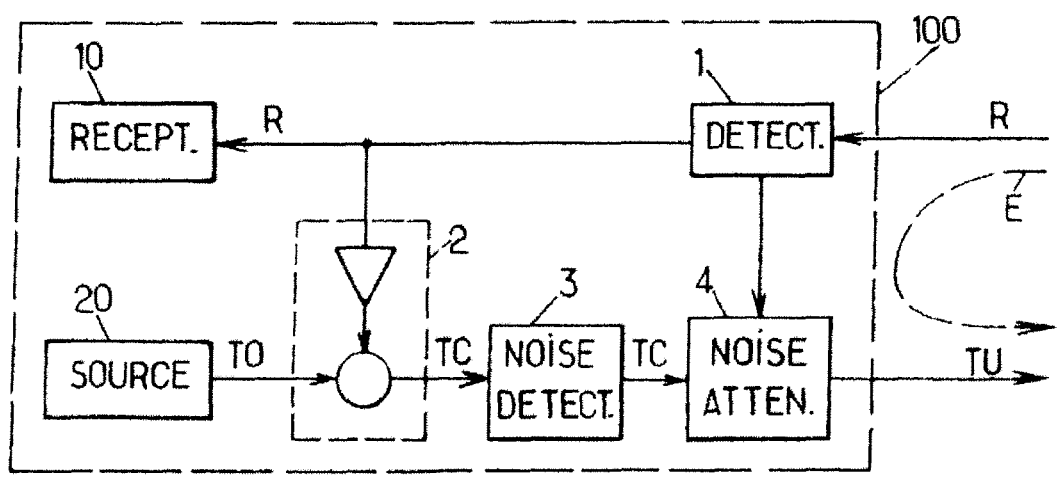
FIG. 2 is a block-diagram illustrating an embodiment of the invention in one of the terminals of FIG. 1.

As shown in FIG. 2, the terminal 100 comprises a signal reception path R ending at a receiver 10, labeled RECEPT. The structure of such reception path is assumed to be known and is not described here. It comprises a detector 1, which produces a reception detection signal. This signal indicates whether signals R are actually received, in real time or with an adjustable delay.

The terminal 100 additionally comprises a transmission path for useful signals, labeled TU. The transmission path comprises a signal source, which is labeled SOURCE and has the reference number 20. This source produces initial transmission signals, labeled T0. It also comprises an echo compensator 2, a noise level detector 3, and a noise attenuation module 4. The noise level detector 3 and the noise attenuation module 4 are respectively labeled NOISE DETECT. and NOISE ATTEN.

In a known manner, the echo compensator 2 looks for a correlation between the received signals R and the initial transmission signals T0. The echo is symbolically represented by the arrow E which connects the reception path to the transmission path. When such a correlation is found, the echo compensator 2 determines a contribution from the signals R in the signals T0, and reduces this contribution by subtracting the signals R from the signals T0. The amplitude of the signals R is adjusted during the subtraction, to better compensate for the contribution from the signals R in the signals T0. The echo compensator 2 thus produces transmission signals which are echo-compensated, and are labeled TC. Such an echo compensator is linear in type. It is therefore simple and inexpensive, but echo compensators of different types may also be used.

The signals TC still contain a residue of the echo E, which in particular corresponds to the non-linear formation mechanisms of the echo E.

The echo compensator 2, or a supplemental component of the terminal 100, determines the level of the residual echo which is present in the echo-compensated transmission signals TC. This residual echo level is labeled <E>.

The detector 1 may possibly also be adapted to detect the received signals R at a first or a second acquisition rate depending on whether the contribution of these received signals to the initial transmission signals T0 is zero or not zero respectively. In other words, the first acquisition rate of the detector 1 is adopted in the absence of echo, and the second acquisition rate in the presence of echo. The first acquisition rate is therefore advantageously slower than the second acquisition rate, to reduce the power consumption of the terminal 100. Such adaptation of the acquisition rate of the detector 1 is not connected to the use of the echo compensator 2. It may be implemented even if an echo compensator is not used in the reception path of the terminal 100.

The noise level detector 3 determines a noise level which is present in the echo-compensated transmission signals TC. This noise level is labeled <N>. The levels <E> and/or <N> may be dynamically adjusted as a function of the variations in the signal TC in a known manner. Alternatively, the levels <E> and/or <N> may have values which are initially determined.

Two activation thresholds are then defined: a first threshold which is labeled Th1 and which is greater than the noise level <N>, and a second threshold which is labeled Th2 and which is greater than the residual echo level <E>. If the residual echo which is present in the signals TC is perceptible, then the level <E> is greater than the level <N>. Preferably, the level Th1 is selected to be slightly greater than the level <N>, to reduce attenuation of useful portions of the signals TC of low amplitude. For the same reason, the level Th2 is also advantageously selected to be slightly greater than the level <E>.

Figure 3:
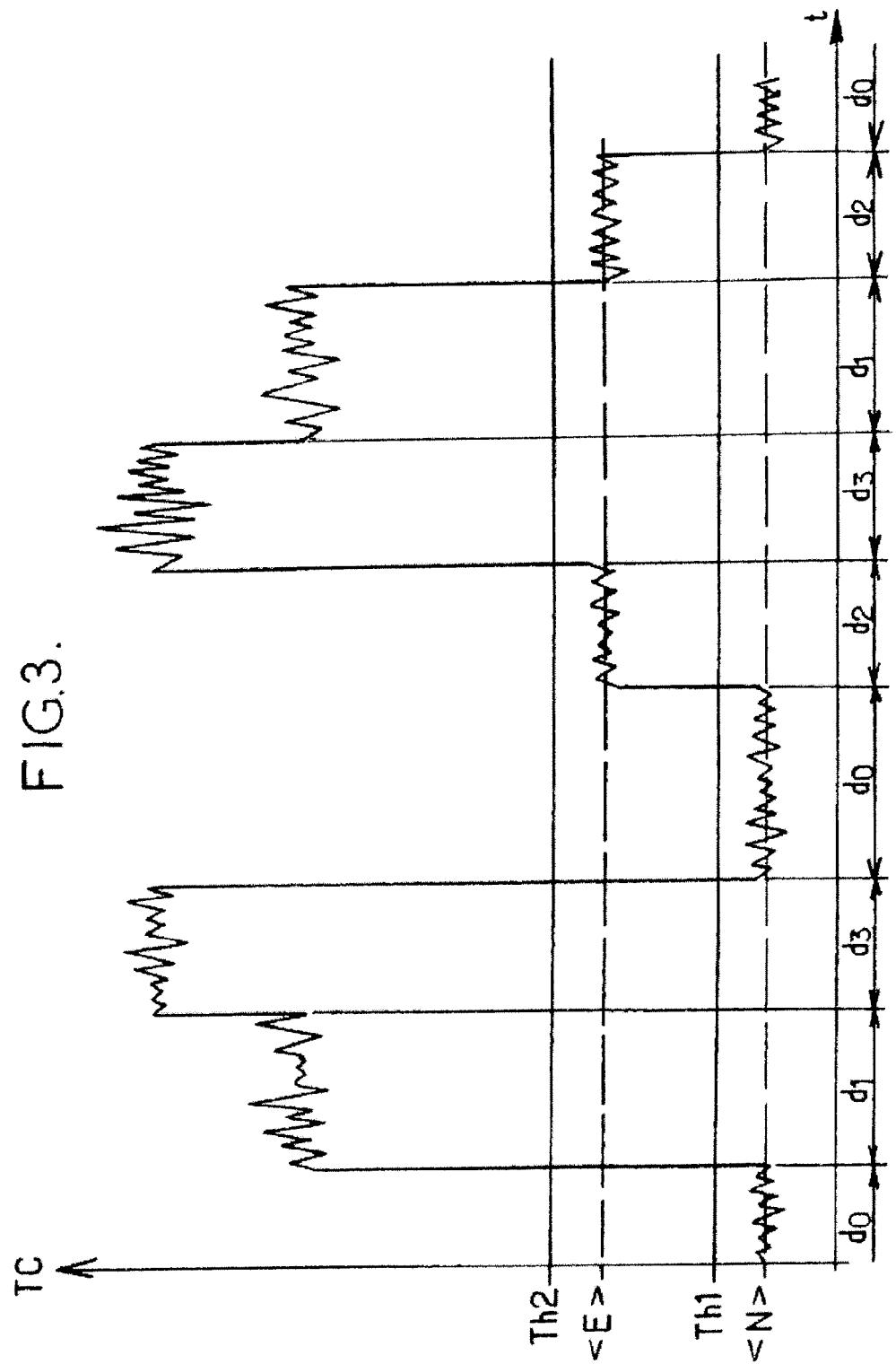
FIG. 3 is a diagram illustrating an activation threshold setting as used in the invention.

FIG. 3 is a diagram which symbolically shows variations over time of the echo-compensated transmission signals TC. t indicates the time, which is shown on the x axis. In general, the level of a signal is understood to mean an average value of its absolute amplitude, which is calculated over a period of time greater than a time characteristic of the noise contained in the signal, but less than the variations related to the useful portion of this signal and/or to the residual echo which may be present. The signal TC contains a transmission portion which is useful during the periods labeled $d_1$, a residual echo portion without a portion of useful transmission signal during the periods labeled $d_2$, and only contains noise during the periods labeled $d_0$. In addition, the useful portion of the transmission signal is superimposed onto the residual echo portion during the periods which are labeled $d_3$. The diagram shows the levels <N> and <E>, as well as the activation thresholds Th1 and Th2.

Figure 4:
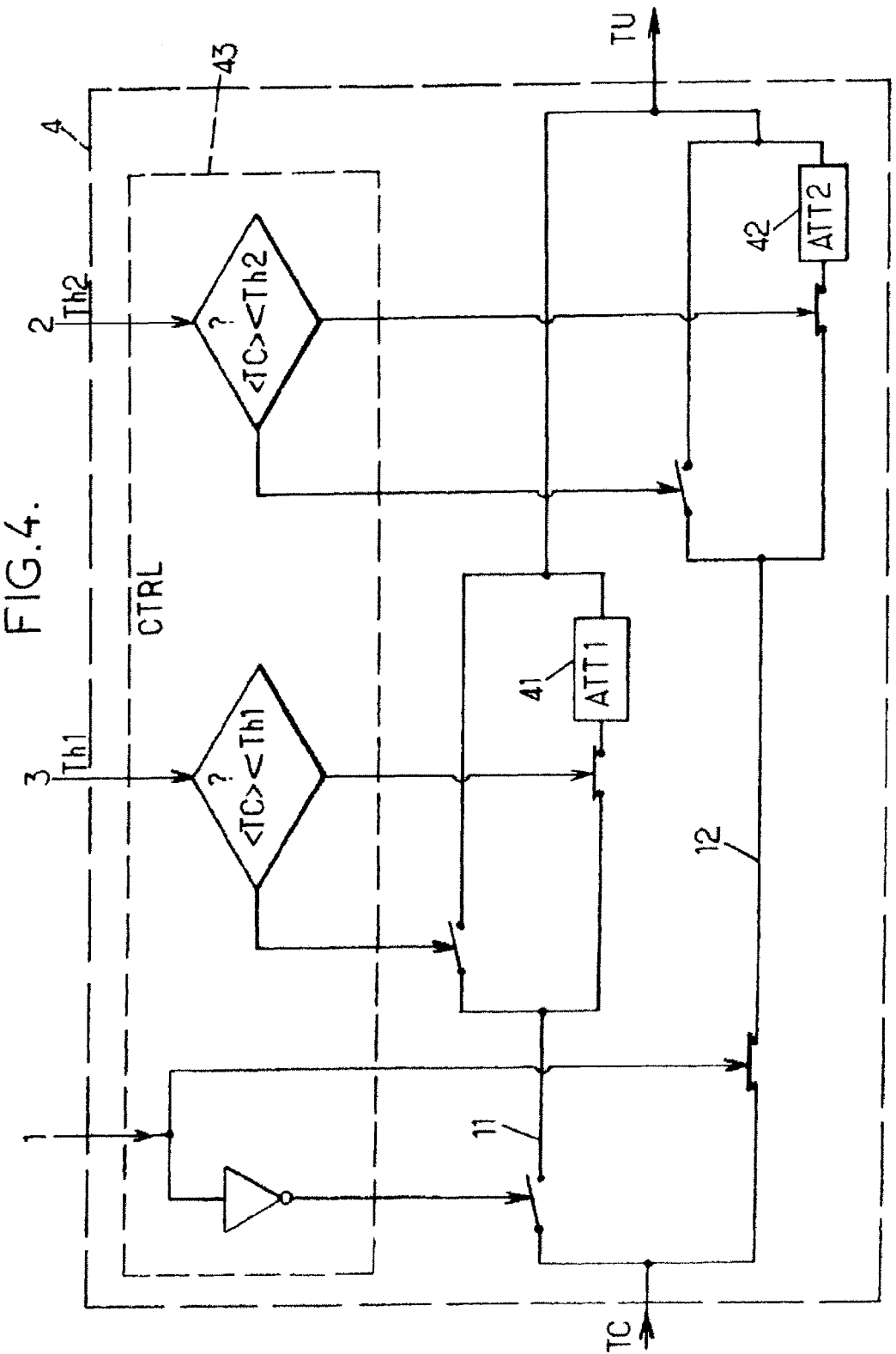
FIG. 4 is a logic diagram illustrating the principle of the invention.

FIG. 4 is a functional representation of the attenuation module 4. It comprises two attenuators 41 and 42, respectively labeled ATT1 and ATT2, as well as a controller 43, labeled CTRL. Each attenuator 41, 42 reduces the amplitude of the signal it receives as input, according to a fixed attenuation coefficient. The representational symbols and conventions used in this figure are known to a person skilled in the art.

When the required performance in terms of residual echo is −65 dBfs (decibels calculated relative to the total amplitude of variation, an abbreviation for "dB relative to full scale") and the echo compensator 2 allows obtaining a residual echo level of −55 dBfs in the presence of non-linear echo mechanisms, the attenuator 42 may have an attenuation coefficient of 10 dB with an activation threshold Th2 of −50 dBfs. The attenuator 42 then allows obtaining −65 dBfs of residual echo in the useful transmission signals TU.

When the required performance in terms of noise in the useful transmission signals TU, in the absence of echo, is −70 dBfs, while the noise level of the transmission signals TC is −65 dBfs, the attenuator 41 may have an attenuation coefficient of 5 dB with an activation threshold Th1 of −60 dBfs.

The echo-compensated transmission signals TC are first directed to the branch 11 or the branch 12, depending on the reception detection signal produced by the detector. Thus, the signals TC are processed by following the branch 12 if the signal of the detector 1 indicates that signals R are received, and by following the branch 11 if not. The processing of signals TC by the attenuation module 4 then depends on the level of these signals TC.

When they are processed by the branch 11, meaning in the absence of received signals R which would be likely to produce a residual echo, the signals TC are processed by the attenuator 41 if their level is less than the activation threshold Th1. They are then attenuated, meaning their amplitude is reduced in accordance with the attenuation coefficient of the attenuator 41. This case corresponds to the periods $d_0$ indicated in FIG. 3. Conversely, the signals TC are directly transmitted by the branch 11 without attenuation if their level is greater than the activation threshold Th1. This case corresponds to the periods $d_1$ indicated in FIG. 3.

When they are processed by the branch 12, meaning in the presence of received signals R which could produce a residual echo, the signals TC are processed by the attenuator 42 if their level is less than the activation threshold Th2. This case corresponds to the periods $d_2$ which are indicated in FIG. 3, and possibly also to some of the periods $d_0$ when the signals R do not cause residual echo. The attenuator 42 then reduces the amplitude of the echo-compensated transmission signals TC according to its attenuation coefficient. The signals TC are directly transmitted by the branch 12 without attenuation if their level is greater than the activation threshold Th2. This last case corresponds to the periods $d_1$ and $d_3$ which are indicated in FIG. 3. During the periods $d_3$, the residual echo is transmitted in the useful transmission signals TU. But it is then not irritating, because it is superimposed over the useful content of the signals TC.

In a first improvement, each attenuator 41, 42 may attenuate the signals TC according to an attenuation coefficient which varies during a period of decreasing attenuation which is specific to it, by producing an attenuation which is progressively lower after the level of the signals TC has increased to above the corresponding activation threshold Th1 or Th2. The duration of the attenuation reduction of the attenuator 41 is then advantageously shorter than that of the attenuator 42 in order to avoid attenuating the start of useful portions of transmission signals in the absence of echo, and to be less sensitive to the presence of residual echo which would have an instant-level greater than the activation threshold Th2.

In a second improvement, each attenuator 41, 42 may also attenuate the signals TC according to an attenuation coefficient which varies during a period of increasing attenuation which is specific to it, by producing an attenuation which is progressively greater after the level of the signals TC has decreased to below the corresponding activation threshold Th1 or Th2. The duration of the increasing attenuation of the attenuator 41 is then advantageously longer than that of the attenuator 42, to avoid attenuating the ends of the useful portions of transmission signals in the absence of echo, and to return to an effective reduction of the residual echo when such is present.

In a third improvement, the activation threshold for at least one of the attenuators 41 and 42 may differ according to whether the level of the signal TC is increasing or decreasing. Such an improvement allows fine-tuning the attenuators just described for the first or second improvement. It also allows reducing the auditory perception by the user 201 of the activation and deactivation of the attenuators 41 and 42.

In a fourth improvement, the attenuators 41 and 42 may be activated when the level of the signals TC decreases to below the corresponding activation threshold Th1 or Th2, with a predetermined delay after the activation threshold is crossed. The activation of the attenuator 41 or 42 is then effective if the level of the signal TC remains below the corresponding activation threshold for the duration of the predetermined delay. In this manner, it is possible to avoid generating activation events which could still be audible.

It is understood that the invention can be implemented by modifying certain aspects of the embodiment which has been described. In particular, the echo compensator 2 is not necessary in all cases. In addition, the transmission and reception paths of the terminal 100 obviously contain additional components beyond those cited for their use in the invention. Such additional components are well known and have not been described for this reason.

The invention claimed is:

1. A communication terminal adapted to operate in a full-duplex audio communication mode, comprising:
 a detector of signals received by the terminal, adapted to produce a reception detection signal indicating a presence or absence of received signals; and
 a noise attenuation module arranged to attenuate transmission signals produced by the terminal when a level of said transmission signals is less than an activation threshold,
 the noise attenuation module is additionally adapted to select a value for the activation threshold in a manner which varies according to the reception detection signal, with a first value selected when received signals are absent, which is less than a second value selected when received signals are present,
 the terminal additionally being adapted to determine the first and the second values selected for the activation threshold so that said first and second values are additionally and respectively greater than a noise level of the transmission signals and greater than a level of a contribution from received signals which is present in said transmission signals.

2. The terminal according to claim 1, additionally comprising an echo compensator arranged to receive as input initial transmission signals produced by the terminal, and to produce as output echo-compensated transmission signals corresponding to the initial transmission signals reduced by a portion of a contribution of signals received by said terminal which is present in said initial transmission signals,
 with said noise attenuation module being arranged to attenuate the echo-compensated transmission signals when the level of said echo-compensated transmission signals is less than the selected value of the activation threshold, and
 with the first and second values selected for the activation threshold being respectively greater than a noise level of the echo-compensated transmission signals and greater than a level of a residual contribution from received signals which is present in said echo-cancelled transmission signals.

3. The terminal according to claim 1, wherein the noise attenuation module is additionally adapted to perform less and less attenuation, during an attenuation reduction period of variable duration, of the transmission signals when the level of said transmission signals increases to above the selected value of the activation threshold,
 with said period of attenuation reduction being longer when the reception detection signal indicates that received signals are present, in comparison to said period of attenuation reduction when said reception detection signal indicates that received signals are absent.

4. The terminal according to claim 1, wherein the noise attenuation module is additionally adapted to perform more and more attenuation, during an attenuation increase period of variable duration, of the transmission signals when the level of said transmission signals decreases to below the selected value of the activation threshold,
 with said period of attenuation increase being shorter when the reception detection signal indicates that received signals are present, in comparison to said period of attenuation increase when said reception detection signal indicates that received signals are absent.

5. The terminal according to claim 1, wherein the noise attenuation module is additionally adapted to select the value of the activation threshold in a variable manner based on whether the level of the transmission signals is increasing or decreasing, in at least one of the two cases where the reception detection signal indicates a presence or an absence of received signals.

6. The terminal according to claim 1, wherein the noise attenuation module is additionally adapted to attenuate the transmission signals if the level of said transmission signals decreases to below the selected value of the activation threshold, after a set period and if said level of the transmission signals has remained less than the selected value of the activation threshold during the set period.

7. The terminal according to claim 1, wherein the received signal detector is adapted to detect said received signals at a first or a second acquisition rate depending on whether the contribution from said received signals to the transmission signals is zero or not zero respectively, with said first acquisition rate being slower than said second acquisition rate.

8. An audio signal transmission process according to a full-duplex communication mode comprising:
   /1/ determining a noise level of transmission signals produced by a communication terminal, and a level of a contribution from signals received by said terminal which is present in the transmission signals; and
   /2/ attenuating the transmission signals when a level of said transmission signals is less than an activation threshold,
   wherein the activation threshold has a value selected in a manner which varies according to whether the signals received by the terminal are detected or not detected, with a first value selected when received signals are not detected, which is less than a second value selected when received signals are detected, the selected first value additionally being greater than the noise level of the transmission signals, and the selected second value being greater than the level of the contribution from received signals which is present in said transmission signals.

9. The process according to claim 8, additionally comprising:
   /A/ in transmission signals produced by the communication terminal, compensating for a portion of the contribution from signals received by said terminal which is present in said transmission signals, so as to produce echo-compensated transmission signals;
   with steps /1/ and /2/ performed using the echo-compensated transmission signals, in the following manner:
   /1/ determining a noise level of the echo-compensated transmission signals, and a level of a residual contribution from received signals which is present in said echo-compensated transmission signals; and
   /2/ attenuating the echo-compensated transmission signals when a level of said echo-compensated transmission signals is less than the value selected for the activation threshold,
   with the first value selected for the activation threshold being greater than the noise level of the echo-compensated transmission signals, and the second value selected for said activation threshold being greater than the level of the residual contribution from received signals which is present in said echo-compensated transmission signals.

10. The process according to claim 8, wherein, when the level of the transmission signals increases to above the selected value of the activation threshold, then the attenuation of said transmission signals is progressively reduced over a variable period of attenuation reduction,
   with said period of attenuation reduction being longer when received signals are detected, in comparison to said period of attenuation reduction when no received signal is detected.

11. The process according to claim 8, wherein, when the level of the transmission signals decreases to below the selected value of the activation threshold, then the attenuation of said transmission signals is progressively increased over a variable period of attenuation increase,
   with said period of attenuation increase being shorter when received signals are detected, in comparison to said period of attenuation increase when no received signal is detected.

12. The process according to claim 8, wherein the value of the activation threshold is additionally selected in a manner which varies according to whether the level of the transmission signals is increasing or decreasing, in at least one of the two cases where received signals are detected or not detected.

13. The process according to claim 8, wherein, if the level of the transmission signals decreases to below the selected value of the activation threshold, then said transmission signals are attenuated after a set period if said level of the transmission signals has remained less than the selected value of the activation threshold during the set period.

14. The process according to claim 8, wherein the received signals are detected at a first or a second acquisition rate depending on whether the contribution from said received signals to the transmission signals is zero or not zero respectively, with said first acquisition rate being slower than said second acquisition rate.

* * * * *